(12) United States Patent
Nataraj et al.

(10) Patent No.: US 7,501,078 B2
(45) Date of Patent: Mar. 10, 2009

(54) PROCESS FOR GENERATING SYNTHESIS GAS USING CATALYZED STRUCTURED PACKING

(75) Inventors: Shankar Nataraj, Allentown, PA (US); Robert Roger Broekhuis, Allentown, PA (US); Diwakar Garg, Emmaus, PA (US); Xiaoyi He, Orefield, PA (US); Xianming Jimmy Li, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 107 days.

(21) Appl. No.: 11/651,765

(22) Filed: Jan. 10, 2007

(65) Prior Publication Data

US 2008/0164442 A1    Jul. 10, 2008

(51) Int. Cl.
C01B 3/26 (2006.01)
(52) U.S. Cl. .................................. 252/373; 423/652
(58) Field of Classification Search ............... 423/650, 423/651, 652; 252/373
See application file for complete search history.

(56) References Cited

U.S. PATENT DOCUMENTS

| | | | | |
|---|---|---|---|---|
| 3,607,125 | A | * | 9/1971 | Kydd ............................ 422/197 |
| 4,340,501 | A | | 7/1982 | Davidson |
| 4,690,690 | A | * | 9/1987 | Andrew et al. ............. 48/214 A |
| 4,731,229 | A | | 3/1988 | Sperandio |
| 4,919,844 | A | * | 4/1990 | Wang ........................... 252/373 |
| 5,112,578 | A | * | 5/1992 | Murayama et al. ............ 422/197 |
| 5,350,566 | A | | 9/1994 | Stringaro |
| 5,932,141 | A | | 8/1999 | Rostrop-Nielsen |
| 6,395,251 | B1 | * | 5/2002 | Cotting ......................... 423/652 |
| 6,746,624 | B1 | | 6/2004 | Seier Christensen |
| 6,773,256 | B2 | | 8/2004 | Joshi |
| 2003/0027096 | A1 | | 2/2003 | Barnett |
| 2003/0064011 | A1 | | 4/2003 | Burlingame |
| 2004/0065014 | A1 | | 4/2004 | Christensen |
| 2006/0008399 | A1 | | 1/2006 | Feinstein |
| 2006/0019827 | A1 | | 1/2006 | Whittenberger |

FOREIGN PATENT DOCUMENTS

| | | |
|---|---|---|
| EP | 0 025 308 | 3/1981 |
| EP | 0 025 308 A | 3/1981 |
| EP | 0 073 150 A | 3/1983 |
| EP | 1 277 698 A2 | 12/1984 |
| EP | 1 069 070 A2 | 1/2001 |
| EP | 1 254 705 A1 | 11/2002 |
| EP | 1 403 215 A1 | 3/2004 |
| EP | 1 403 217 A1 | 3/2004 |
| WO | WO 01 94006 | 12/2001 |

OTHER PUBLICATIONS

U.S. Appl. No. 11/435541, Repasky.

(Continued)

*Primary Examiner*—Wayne Langel
(74) *Attorney, Agent, or Firm*—Bryan C. Hoke, Jr.

(57) ABSTRACT

A process for generating synthesis gas wherein a reactant gas mixture comprising steam and a light hydrocarbon is introduced into a tubular reactor comprising a catalyzed structured packing at higher inlet mass rates than conventional tubular reactors containing random packing catalyst pellets or catalyzed structure packing.

11 Claims, 2 Drawing Sheets

OTHER PUBLICATIONS

Perry's Chemical Engineers Handbook, 6$^{th}$ Ed., pp. 18-24 through 18-27.

Nijhuis, et al., "Preparation of Monolithic Catalysis", Catalysis Reviews 2001, 43(4), 345-380.

Ryden, et al; "Using Steam Reforming to Produce Hydrogen with Carbon Dioxide Capture by Chemical-Looping Combustion"; International Journal of Hydrogen Energy Elsevier Science Publishers B.V.; Barking, GB; vol. 31, No. 10; Aug. 1, 2006; pp. 1271-1283; XP005498646.

Jianguo Xu, et al; "Methane Steam Reforming. II: Diffusional Limitations and Reactor Simulation"; Aiche Journal; vol. 35, No. 1; Jan. 1989; pp. 97-103; XP002482568.

Rostrup-Niewlsen J R; "Production of Synthesis Gas"; Catalysis Today; Amsterdam, NL; vol. 18, Jan. 1, 2993; pp. 305-324; XP000949197.

Robert H. Perry, et al; "Chemical Engineers' Handbook"; Mc Graw-Hill; 1973; 5th Edition; pp. 18-21 - 18-27; XP002483423.

* cited by examiner

PROCESS FOR GENERATING SYNTHESIS GAS USING CATALYZED STRUCTURED PACKING

BACKGROUND

This invention relates to the field of synthesis gas generation and more specifically to synthesis gas generation using catalyzed structured packing in reformer tubes in a combustion fired reformer.

The steam reforming process is a well known chemical process for hydrocarbon reforming. A reactant gas mixture comprising steam and a light hydrocarbon reacts in the presence of a catalyst to form hydrogen, carbon monoxide and carbon dioxide. Since the reforming reaction is strongly endothermic, heat must be supplied to the reactant mixture, such as by heating catalyst-containing tubes in a furnace called a reformer. The amount of reforming, i.e. conversion, achieved depends, among other things, on the temperature of the gas leaving the catalyst-containing tubes. Exit temperatures in the range 700-950° C. are typical for conventional steam-hydrocarbon reforming.

The light hydrocarbon feedstock forming the reactant gas mixture is typically pretreated to remove sulfur, and to saturate olefins. The light hydrocarbon feedstock may be mixed with steam and preformed so that hydrocarbons heavier than methane react with steam to form a mixture having substantially reduced concentrations of the heavier hydrocarbons, and enriched in hydrogen.

Conventionally, reforming catalyst is in the form of pellets, typically comprising nickel dispersed on a suitable ceramic support, such as alumina. The pellets are contained in several tall vertical reformer tubes, generally 5 cm to 20 cm in diameter.

Reformer tubes are spaced inside the furnace for receiving heat from flames generated by surrounding burners fired with fuel and an oxygen-containing gas, such as air or the exhaust from a gas turbine. Radiation from the combustion flames heats the reformer tubes and the gases flowing therein, providing the heat of reaction for reforming the light hydrocarbon and steam. It is desirable to provide sufficient heat transfer to provide heat for reforming.

The reformer tubes and the catalyst contained therein represent one of the most expensive parts, if not the most expensive part of the reformer. Therefore it is desirable to reduce the number of reformer tubes required to process a given amount of reactant gas mixture. Alternatively, it is desirable to process an increased amount of reactant gas mixture for a given number of reformer tubes.

The reformer tubes generally last longer than the catalyst remains sufficiently active. It is therefore desirable that the catalyst is easily replaced. Obviously costs are increased if both the reformer tubes and the catalyst need to be replaced compared to only replacing the catalyst.

Reactors containing catalyzed structured packing have been described, for example tubular reactors used in reforming. The use of a structured packing in a steam reformer has been disclosed, for example in co-pending patent application Ser. No. 11/435541 and U.S. Pat. No. 4,340,501 to Davidson. Compared to dumped packing, also called random packing, such as catalyst pellets, structured packing can produce a lower pressure drop, is not easily fluidized, and is not prone to settling or crushing. It is desired to provide effective operating parameters for tubular reactors containing catalyzed structure packing.

Often, advantage is taken of the lower flow resistance of structured packing by using less compression, resulting in power savings for the process.

BRIEF SUMMARY

A process for generating synthesis gas is disclosed. The process comprises introducing a reactant gas mixture comprising steam and a light hydrocarbon into a tubular reactor at a density modified inlet mass rate of 5.7 kg/m²s to 30 kg/m²s, or at a density modified inlet mass rate of 7 kg/m²s to 30 kg/m²s, or at a density modified inlet mass rate of 8 kg/m²s to 30 kg/m²s, at a first pressure, $P_1$, and at a first temperature wherein the tubular reactor has an inlet end and an outlet end, the inlet end and the outlet end defining a length, L, therebetween, and wherein the tubular reactor comprises a tube portion having an inner surface and an outer surface, and wherein the tubular reactor comprises a catalyzed structured packing within the tube portion; combusting a fuel external to the tubular reactor thereby heating the outer surface of the tube portion to provide heat for reacting the reactant gas mixture; reacting the reactant gas mixture in the tubular reactor thereby converting a percentage of the light hydrocarbon and generating a product mixture comprising synthesis gas; and withdrawing the product mixture from the outlet end at a second pressure, $P_2$ and at a second temperature.

The average overall pressure gradient, $(P_1-P_2)/L$, may be 5000 Pa/m to 50,000 Pa/m or may be 5000 Pa/m to 30,000 Pa/m.

Heating the outer surface of the tube portion may provide an average heat flux ranging from 100 kW/m² to 200 kW/m² at the inner surface of the tube portion.

The percentage of light hydrocarbon converted may be at least 50% or at least 70%.

The second temperature may be at least 200° C. greater than the first temperature.

A process for generating synthesis gas may comprise introducing a reactant gas mixture comprising steam and methane into a tubular reactor at a density modified inlet mass rate of 5.7 kg/m²s to 30 kg/m²s, or at a density modified inlet mass rate of 7 kg/m²s to 30 kg/m²s, or at a density modified inlet mass rate of 8 kg/m²s to 30 kg/m²s, at a first pressure, $P_1$, and at a first temperature wherein the tubular reactor has an inlet end and an outlet end, the inlet end and the outlet end defining a length, L, therebetween, and wherein the tubular reactor comprises a tube portion having an inner surface and an outer surface, and wherein the tubular reactor comprises a catalyzed structured packing within the tube portion; combusting a fuel external to the tubular reactor thereby providing an average heat flux ranging from 100 kW/m² to 200 kW/m² at the inner surface of the tube portion for reacting the reactant gas mixture; reacting the reactant gas mixture in the tubular reactor thereby converting at least 50% or at least 70% of the methane and generating a product mixture comprising synthesis gas; and withdrawing the product mixture from the outlet end at a second pressure, $P_2$ and at a second temperature.

DETAILED DESCRIPTION

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

Synthesis gas, commonly called syngas, is a mixture comprising hydrogen and carbon monoxide.

A combustion process is defined as any process, such as a furnace process, that reacts carbonaceous fuel and oxidant to produce $CO_2$ and other gases.

As described in the Background section, structured packing can exhibit a lower resistance to fluid flow compared to dumped packing. As an alternative to electing power savings through less compression of the reactant gas mixture, the flow rate to the reactor comprising structured packing may be increased to achieve a comparable pressure drop through a reactor comprising dumped packing. However, the increased flow rate reduces the residence time of the reactant gases in the tubular reactor and raises the concern that residence time and/or heat transfer may not be sufficient for satisfactory conversion of the reactant gas mixture to the product mixture.

The inventors have unexpectedly discovered that the increased catalyst geometric surface area of the structured packing may sufficiently compensate for the reduced residence time in the tubular reactor when the flow rate is increased. Increased heat transfer provided by the higher flow rate may also help compensate for the reduced residence time in the tubular reactor. The higher flow rate also translates into fewer reformer tubes needed to process a given amount of reactant gas mixture.

The process described herein relates to a process for generating synthesis gas. The process may be useful in a reformer with reformer tubes.

Figure 1:
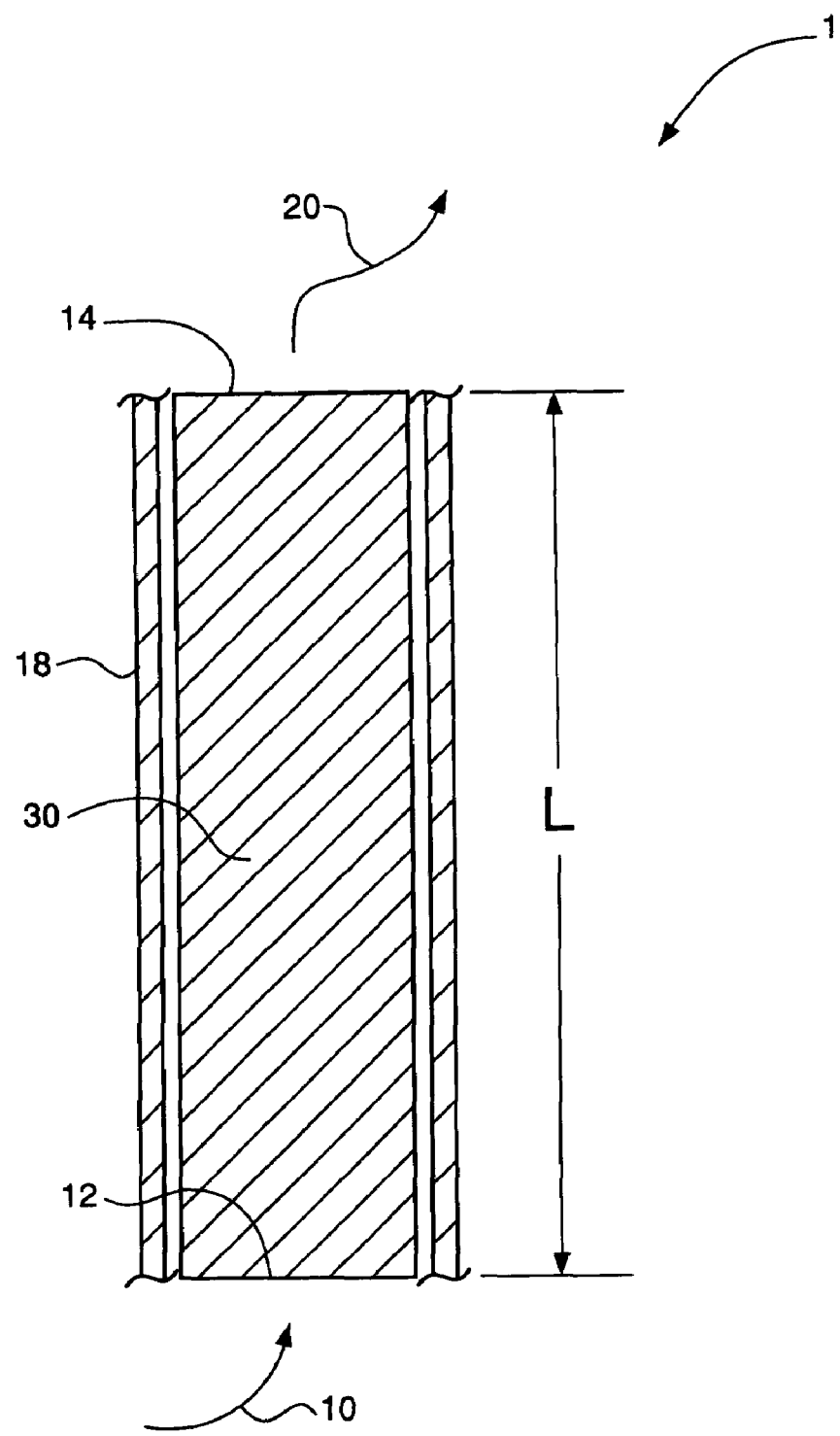
FIG. 1 illustrates tubular reactor comprising catalyzed structured packing.

Referring to FIG. 1, the process for generating synthesis gas comprises introducing a reactant gas mixture 10 into a tubular reactor 1. The reactant gas mixture 10 comprises steam and a light hydrocarbon. As defined herein, a light hydrocarbon is an organic compound containing only hydrogen atoms and carbon atoms and includes linear and branched alkanes having from 1 to 10 carbon atoms. The light hydrocarbon may be methane, ethane, propane, butane, n-pentane, and/or any light hydrocarbon known in the art for the production of synthesis gas.

Use of the term "a" light hydrocarbon does not preclude more than one light hydrocarbon. The reactant gas mixture may comprise steam and at least two light hydrocarbons and/or inerts such as nitrogen. For example, when natural gas is used as a feedstock to form the reactant gas mixture, the reactant gas mixture may comprise steam, methane, ethane, propane, carbon dioxide, nitrogen, and to a lesser extent, oxygen, argon, helium, neon and/or xenon.

The source of the at least one light hydrocarbon may be a natural gas pipeline or may be offgases from a refinery or may be a naphtha stream. Refinery offgases may contain paraffins and olefins. Preferably if the feedstock contains olefins (alkenes), they are substantially hydrogenated to paraffins (alkanes) prior to feeding the reformer. The feedstock is also substantially desulfurized prior to feeding the reformer. Optionally, hydrocarbon steam mixture is preformed prior to feeding the tubular reactor.

The tubular reactor 1 has an inlet end 12 and an outlet end 14. The length, L, of the tubular reactor 1 extends from the inlet end 12 to the outlet end 14. Although the tubular reactor 1 is shown in a vertical arrangement with the inlet end 12 at the bottom and the outlet end 14 at the top, the tubular reactor 1 may have the inlet end 12 at the top and the outlet end 14 at the bottom. Alternatively, the tubular reactor 1 may be horizontal or in a tilted orientation.

The outer body of the tubular reactor 1 comprises a tube portion 18. For convenience, the term "tube" and "tubular" will be used herein, but is meant to include pipes, conduits, and any hollow body for conducting a liquid and/or gas. The cross-section is typically substantially circular and substantially uniform. Substantially circular means that it is circular within manufacturing tolerances. Substantially uniform means that it is uniform within manufacturing tolerances.

The tube portion has an inner surface and an outer surface. The outer diameter of the tube portion 18 may be 2.5 cm to 25 cm.

Reformer tubes are typically made from spun-cast alloys of Fe/Ni/Cr with small amounts of carbon and optionally traces of exotic elements such as niobium. Examples include alloys such as HK40, HP50, and HP50 micro alloys. The tube material may be selected from any suitable tube material known in the art.

The tubular reactor 1 has a cross-section and comprises catalyzed structured packing 30 within the tubular reactor cross-section. Alternatively stated, the tubular reactor 1 is that portion of the overall tube having catalyzed structured packing 30 within the tubular reactor cross-section. The catalyzed structure packing may have incidental contact with a portion of the inner tube wall or it may maintain a small gap throughout. The structured packing may have one or more solid or hollow cores. Empty portions of the overall tube that do not have catalyzed structured packing in the cross-section (not shown), for example between a manifold (not shown) and the portion containing structured packing, are not part of the tubular reactor 1 as defined herein. A reformer tube is the overall tube and comprises the tube portion containing catalyzed structured packing and the empty portion of the overall tube.

Structured packing, also called arranged packing, is defined as any packing wherein one or more individual segments have a plurality of constructed passages and an intended orientation relative to the tube axis when placed in the tube. Multiple segments have an intended longitudinal orientation relative to each other but may have an intended or random rotational relationship to one another.

The constructed passages may be substantially parallel passages.

The term plurality as used herein means at least 3. Substantially parallel means parallel within manufacturing tolerances.

A structured packing segment may fill the cross section of the tube or may fill the cross section of the tube in combination with one or more other structure packing segments as described in co-pending U.S. patent application Ser. No. 11/435541.

Both structured packing segments and random packing pellets (with the exception of perfect spheres) possess at least one identifiable axis, an axis of congruency, a reference direction that serves to orient several similar structured packing segments or pellets relative to the tube axis and/or each other.

In a random packing of pellets, the axes of the individual pellets are randomly oriented. In a packing of structured packing segments, the axes of the individual segments are substantially oriented in predictable or intended directions relative to the axis of the tube. For example, the axes of the segments may all be parallel to the reformer tube when placed in service. Alternately, the segments may be disposed at a constant slant relative to the tube axis.

The main axis of the structured packing segments may be parallel to the main axis of the reformer tube when placed in service. Individual structured packing segments may be stacked one on top of other, and all with an axis substantially parallel to the axis of the reformer tube. In contrast, the axis of random packings of cylindrical or prismatic pellets are oriented in random directions relative to the axis of the tube. Structured packings are distinguished from random packings by the fact that the dimensions and orientations of the passages they define are determined substantially by the design of the structure and its purposeful placement, not by the random arrangement of smaller particles in a packed-bed configuration.

Structured packings may have angled passages that cause the fluid flowing therein to move alternatingly through the passages in the structured packing and through the space between the structured packing and the reformer tube wall.

Structured packings may be ceramic honeycombs, metal honeycombs, plate stacks, and the like. The structure may be constructed of any material and/or alloy commonly used for structures, for example, cordierite, corundum, FeCr Alloy, 300-series stainless steels, Inconels, Incalloys, aluminum, or even carbon steel. Suitable materials having corrosion resistance and mechanical properties for the service for which they are to be used are known in the art.

Examples of structured packing include the structures disclosed in U.S. Pat. No. 4,340,501 to Davidson, U.S. Pat. No. 5,350,566 to Stringaro, U.S. Pat. App. Pub. No. 2006/0019827 to Whittenberger, EP 1,254,705 to Schildhauer, U.S. Pat. Pub. No. 2006/0008399 to Feinstein, and co pending patent application Ser. No. 11/435541.

Catalyzed structured packing is structured packing comprising catalyst. Catalyst may be applied by any means known in the art and/or the structured packing may be formed all or in part from a material having catalytic behavior. Catalyst may be deposited, impregnated and/or coated onto the carrier structures at any point during the catalyzed structured packing fabrication process. Catalyst may be applied to intermediate components, for example plates, used to form the structure or may be applied after the structure is formed. Methods for depositing, impregnating, and/or coating catalyst layers onto supporting structures are well-known in the art and described, for example, in Catalysis Reviews 2001, 43(4), 345-380.

Suitable catalysts include nickel-based catalysts, noble metal catalysts, and any other catalysts active for steam-hydrocarbon reforming known in the art. Examples of suitable catalysts are compositions comprising nickel, cobalt, platinum, palladium, rhodium, ruthenium, and/or iridium.

The tubular reactor 1 may be in fluid communication with a manifold (not shown) that distributes the reactant gas mixture 10 to multiple tubular reactors. The tubular reactor 1 may be in fluid communication with another manifold (not shown) that collects a product mixture 20 from multiple tubular reactors. The process for generating synthesis gas may comprise introducing the reactant gas mixture into a first manifold which distributes the reactant gas mixture to multiple tubular reactors. The process for generating synthesis gas may comprise collecting the product gas mixture from the multiple tubular reactors in a second manifold. A single furnace can contain, and transmit heat to, several parallel tubular reactors spaced geometrically within.

The inlet mass rate, G, to a tubular reactor is defined as the mass flow rate, w (for example having units of kg/s) at the inlet end 12 divided by the cross-sectional flow area, A, of the tube 18 (for example having units of m²), $$\text{i.e. } G = \frac{w}{A}.$$

As disclosed in Perry's Chemical Engineers Handbook, 6th Ed. pp. 18-24 through 18-27, use of the term $$\frac{G}{\phi}$$

permits comparison of other gases with air, where $\phi$ is $\sqrt{\rho_g/\rho_{air}}$, and where $\rho_g$ is the density of the gas of interest and $\rho_{air}$ is the density of air. For the purposes of this disclosure, $\rho_g$ is the density of the reactant gas mixture at the inlet of the tubular reactor in units of kg/m³ and $\rho_{air}$ is 1.2 kg/m³.

The term $$\frac{G}{\phi}$$

is herein called the density modified inlet mass rate.

The reactant gas mixture 10 may be introduced with a density modified inlet mass rate of 5.7 kg/m²s to 30 kg/m²s, or 7 kg/m²s to 30 kg/m²s, or 8 kg/m²s to 30 kg/m²s. It may not be desirable to operate a reformer having conventional dumped packing at these high density modified mass rates due to high pressure drop thereby requiring high compression energy.

The reactant gas mixture 10 may be introduced at a first pressure, $P_1$ and a first temperature.

The process comprises reacting the reactant gas mixture 10 in the tubular reactor 1 thereby converting a percentage of the light hydrocarbon and generating a product mixture 20 comprising synthesis gas. Synthesis gas is formed from the reactant gas mixture 10 by reaction in the tubular reactor 1 at suitable temperatures and pressures known in the art. The process gas temperature increases as the gas flows through the tubular reactor. The temperature at the inlet end (that is, the feed temperature) may range from 350-700° C., and the temperature at the outlet may range from 750-950° C. The inlet pressure may be in the range 1 MPa to 5 MPa.

The process may comprise reacting the reactant gas mixture 10 in the tubular reactor 1 thereby converting at least 50% or at least 70% of the light hydrocarbon and generating a product mixture 20 comprising synthesis gas.

The process comprises withdrawing the product mixture 20 from the outlet end 14 at a second pressure, $P_2$ and at a second temperature.

The average overall pressure gradient, $$\frac{(P_1 - P_2)}{L},$$

may be from 5000 Pa/m to 50,000 Pa/m or from 5000 Pa/m to 30,000 Pa/m.

The linear pressure difference may be affected by the density modified inlet mass rate. The linear pressure difference may be affected by the selection of the structured packing that is provided. The linear pressure difference may be affected by expanding the structured packing after it has been installed as discussed in co-pending patent application Ser. No. 11/435541.

Reforming of steam and a light hydrocarbon is an endothermic reaction. To provide heat for the endothermic reaction, the process comprises combusting a fuel external to the tubular reactor thereby heating the outer surface of the tube portion. Combustion may be provided by a burner such as described by Joshi et al., U.S. Pat. No. 6,773,256 or by any suitable burner known in the art of reformers.

A higher average heat flux may be provided to the tubular reactor comprising catalyzed structured packing at a higher density modified inlet mass rate compared to dumped or random catalyst packing at a lower density modified inlet mass rate. Heat transfer for the tubular reactor comprising catalyzed structured packing may be affected by selection of the structured packing or by expanding the structured packing after it has been installed as discussed in co-pending patent application Ser. No. 11/435541.

The average inner surface heat flux is the total heat flow rate transferred into the tubular reactor, for example in Watts, divided by the total surface area of the inner surface of the tube portion of the tubular reactor, for example in $m^2$. The total heat flow transferred into the tubular reactor may be determined from the flow rate, composition, pressure, and temperature of the reactant gas mixture and the product mixture using thermodynamic calculations known in the art.

The process may comprise heating the tubular reactor with an average inner surface heat flux of 100 to 200 $kW/m^2$.

The process may comprise providing the tubular reactor comprising a catalyzed structured packing. The process may comprise providing the tubular reactor comprising a catalyzed structured packing wherein the catalyzed structured packing has a linear pressure drop of 5000 to 30,000 Pa/m for a density modified inlet mass flow rate equal to 10 $kg/m^2s$.

Figure 2:
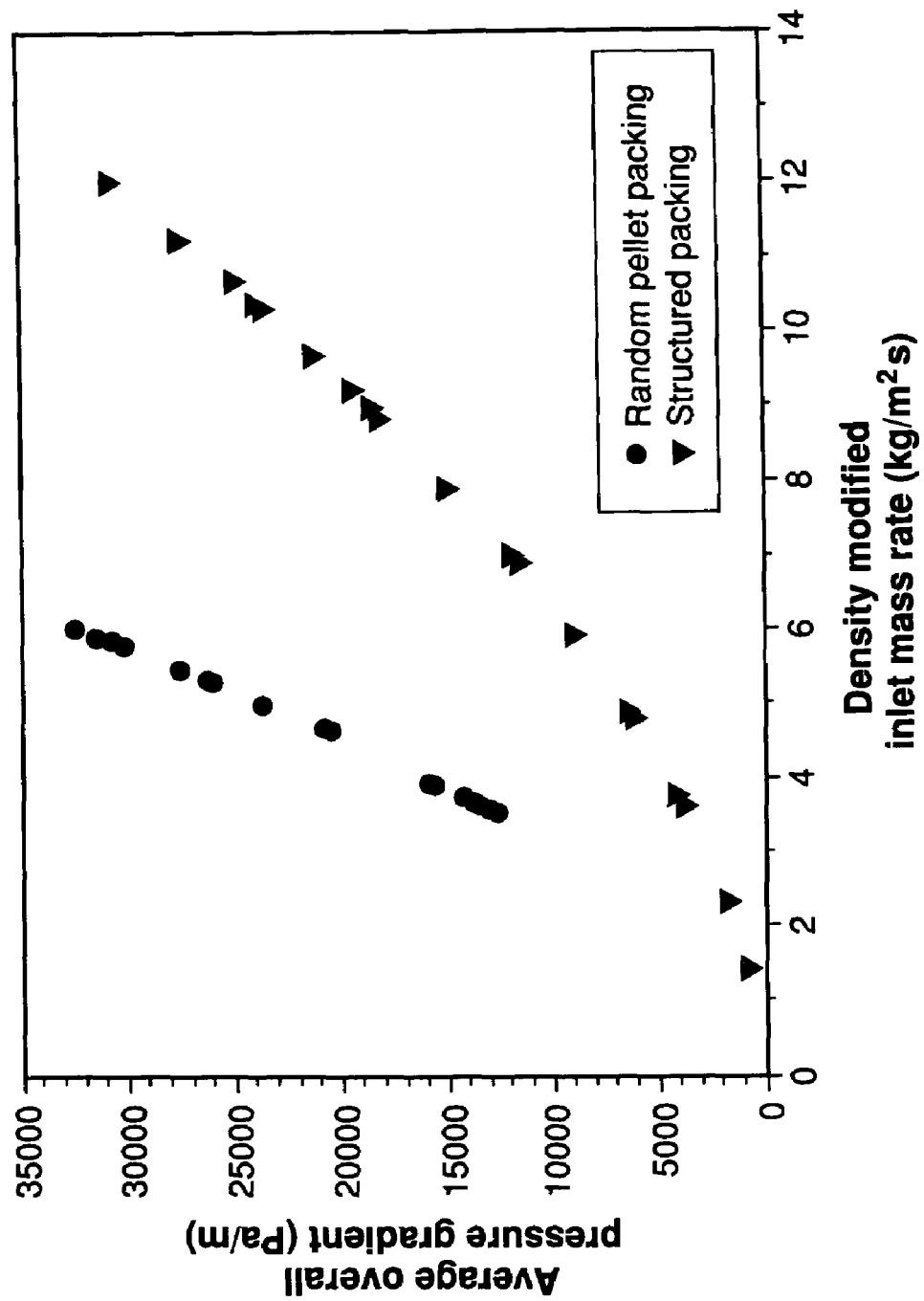
FIG. 2 is a plot of average overall pressure gradient versus density modified inlet mass rate.

FIG. 2 shows a plot of average overall pressure gradient versus density modified inlet mass rate, $$\frac{G}{\phi},$$

for experimental data for the flow of air through various packings. The various packings were inserted into a copper tube having an internal diameter of about 102 mm and a length of about 600 mm.

The random packing pellets were domed cylinders with internal holes. Individual cylinders averaged about 12 mm diameter. They are a typical variety of the pellets used in commercial steam methane reformers.

The structured packing was similar to that described in the Schildhauer patent. The structured packing was constructed from corrugated sheets and flat sheets of aluminum having a thickness of about 0.2 mm. The peak-to-valley height of corrugations was about 3 mm and the vertex angle was about 90°. The corrugated sheets were oriented so that when placed in the tube, the flow passages created by the corrugations were at an angle of 65° to the flow axis of the tube. The corrugated sheets and flat sheets were arranged in alternating fashion. Each corrugated sheet was oriented in reverse direction from its nearest neighbors, so as to define a criss-crossing pattern of channels through the structure. The structured packing was constructed in segments having a height of about 100 mm. The diameter of the structured packing section was about 98 mm. Five structured packing segments were inserted and stacked vertically end-on-end in the copper tube.

Air was introduced into the tube at ambient temperature. The outlet of the tube was maintained at atmospheric pressure. The air flow rate was metered. The pressure difference between the inlet and the outlet was measured using a pressure transducer. The average overall pressure gradient was calculated for various inlet mass rates with the results plotted in FIG. 2.

The plot shows that the average overall pressure gradient for the random packing pellets is greater than for the structured packing for a given density modified inlet mass rate. Structured packings operating at density modified inlet mass rates in the range of 7 $kg/m^2s$ to 12 $kg/m^2s$ may provide similar average pressure gradients to random packing with density modified inlet mass rates in the range of 3.5 $kg/m^2s$ to 5.5 $kg/m^2s$. These average overall pressure gradients were measured with fresh packings, when the pellets are whole. In practice, the pellets crush during the reformer campaign, which would increase the pressure drop over that of FIG. 2. The structured packing will not crush, and its average overall pressure gradient drop would be retained throughout the campaign.

EXAMPLE

Reforming of steam and methane was computationally simulated for random catalyst pellets and catalyzed structured packing. Input data and results are summarized in TABLE 1.

The density modified inlet mass rate is based on physical properties of the reactant gas mixture at the inlet of the tubes.

TABLE 1

| Parameter | Case 1 | Case 2 | Case 3 | Case 4 |
|---|---|---|---|---|
| Tube ID (cm) | 10 | 10 | 10 | 7.6 |
| No. of tubes | 352 | 352 | 272 | 326 |
| Tube wall thickness (cm) | 1 | 1 | 1.7 | 1.1 |
| Catalyst | Random Pellets | Structured Packing | Structured Packing | Structured Packing |
| Heat Flux ($kW/m^2$) | 81 | 81 | 105 | 117 |
| $\frac{G}{\phi}$ {$kg/m^2s$} | 4.5 | 4.5 | 5.9 | 8.7 |
| Average Overall Pressure Gradient (Pa/m) | 26532 | 8881 | 14103 | 25980 |

Case 1 represents a typical steam methane reformer design with random catalyst pellets. The simulation is based on the same catalyst pellets used in the air flow experiments in FIG. 2. The pressure gradient shown is for the catalyst freshly loaded into a reformer. Over the years, as the reformer experiences several startups and shutdowns, the reformer tubes will repeatedly expand and contract, crushing the pellets each time the bed settles and the tube contracts. The pressure drop will increase during the reformer campaign. Also, the catalyst pellets in the different reformer tubes will experience varying degrees of crushing, resulting in flow imbalance among the 352 tubes. This will in turn cause temperature variation among the reformer tubes.

Case 2 represents a steam methane reformer design with catalyzed structured packing where the structured packing is as described for the structured packing above. The simulation used the same number of tubes having the same inner diameter as Case 1, and the same density modified inlet mass rate as Case 1. The pressure drop for Case 2 is less than for Case 1 therein providing savings in compression power, as taught in the prior art.

Case 3 represents a steam methane reformer design with catalyzed structured packing where the structured packing is as described for the structured packing above. The simulation used fewer tubes and a higher density modified inlet mass rate compared to Case 1. The inner diameter of the tubes for Case 3 was the same as Case 1 but the tube wall thickness was increased since the tube wall temperature is increased for Case 3 due to the higher heat flux.

Case 4 represents a steam methane reformer design with a catalyzed structured packing where the structured packing is as described for structured packing above. The simulation used fewer tubes than Case 1, and the inner diameter of the tubes was decreased for Case 4 relative to Case 1. The tube wall thickness was increased slightly for Case 4 relative to Case 1. Even with the higher heat flux in Case 4, structural considerations permit such a tube wall thickness for a smaller diameter tube.

Cases 1-4 provide substantially the same conversion of the reactant gas mixture. Parameters for cases 1-4 were selected to provide substantially equivalent tube life using a predictive model for tube life.

These results suggest that fewer reformer tubes may be used to produce an equivalent amount of synthesis gas for tubular reactors comprising catalyzed structured packing compared to conventional tubular reactors comprising catalyst pellets, provided a greater density modified inlet mass rate is used for the tubular reactors comprising catalyzed structured packing.

The invention claimed is:

1. A process for generating synthesis gas comprising:
   introducing a reactant gas mixture comprising steam and a light hydrocarbon at a density modified inlet mass rate of 5.7 kg/m²s to 30 kg/m²s, at a first pressure, $P_1$, and at a first temperature into a tubular reactor wherein the tubular reactor has an inlet end and an outlet end, the inlet end and the outlet end defining a length, L, therebetween, and wherein the tubular reactor comprises a tube portion having an inner surface and an outer surface, and wherein the tubular reactor comprises a catalyzed structured packing within the tube portion;
   combusting a fuel and an oxygen-containing gas external to the tubular reactor thereby heating the outer surface of the tube portion by radiation from a flame generated by the combustion of the fuel and the oxygen-containing gas to provide heat for reacting the reactant gas mixture;
   reacting the reactant gas mixture in the tubular reactor thereby converting a percentage of the light hydrocarbon to generate a product mixture comprising synthesis gas; and
   withdrawing the product mixture from the outlet end at a second pressure, $P_2$ and at a second temperature.

2. The process of claim 1 wherein $$5000 \text{ Pa/m} \leq \frac{(P_1 - P_2)}{L} \leq 50{,}000 \text{ Pa/m}.$$

3. The process of claim 1 wherein $$5000 \text{ Pa/m} \leq \frac{(P_1 - P_2)}{L} \leq 30{,}000 \text{ Pa/m}.$$

4. The process of claim 1 wherein the percentage is at least 50%.

5. The process of claim 1 wherein the percentage is at least 70%.

6. The process of claim 1 wherein heating the outer surface of the tube portion provides an average heat flux ranging from 100 kW/m² to 200 kW/m² at the inner surface of the tube portion.

7. The process of claim 1 wherein the light hydrocarbon is methane.

8. The process of claim 1 wherein the light hydrocarbon is propane.

9. The process of claim 1 wherein the density modified inlet mass rate is 7 kg/m²s to 30 kg/m²s.

10. The process of claim 1 wherein the density modified inlet mass rate is 8 kg/m²s to 30 kg/m²s.

11. The process of claim 1 wherein the second temperature is at least 200° C. greater than the first temperature.

* * * * *